United States Patent [19]

Squier et al.

[11] Patent Number: 5,638,133
[45] Date of Patent: Jun. 10, 1997

[54] METHOD OF CREATING VIDEO EFFECTS BY USE OF KEYFRAMES

[75] Inventors: James V. Squier, deceased, late of Penn Valley, by Dianne Squier, executrix; Raymond C. Blackham, Penn Valley; John Abt, Nevada City; Nathan Osborn, Grass Valley, all of Calif.

[73] Assignee: Tektronix, Inc,, Wilsonville, Oreg.

[21] Appl. No.: 446,180

[22] Filed: May 19, 1995

(Under 37 CFR 1.47)

Related U.S. Application Data

[63] Continuation of Ser. No. 55,109, May 3, 1993, abandoned.
[51] Int. Cl.$^6$ ............................................. H04N 9/74
[52] U.S. Cl. .......................... 348/590; 348/578; 348/584; 348/598; 348/600
[58] Field of Search ........................ 348/578, 584, 348/585, 586, 588, 589, 590, 591, 593, 598, 600, 601

[56] References Cited

U.S. PATENT DOCUMENTS

| | | | |
|---|---|---|---|
| 4,472,732 | 9/1984 | Bennett et al. | 358/22 |
| 4,791,489 | 12/1988 | Polatnick | 348/578 |
| 5,331,350 | 7/1994 | Fujita | 348/578 |

FOREIGN PATENT DOCUMENTS

| | | | |
|---|---|---|---|
| 0564247 | 3/1993 | European Pat. Off. | G11B 27/031 |
| 2157126 | 4/1981 | United Kingdom | H04N 5/262 |
| 2245807 | 4/1991 | United Kingdom | G06F 15/62 |
| 9108638 | 11/1990 | WIPO . | |
| 9312502 | 12/1992 | WIPO | G06F 15/62 |

*Primary Examiner*—John K. Peng
*Assistant Examiner*—Nathan J. Flynn
*Attorney, Agent, or Firm*—John Smith-Hill; Francis I. Gray

[57] ABSTRACT

A video effect is created with a video processing machine having a plurality of functions, each of which has a state that is selectively variable in response to change in an associated function parameter. The method comprises selecting a set of functions, specifying a starting keyframe containing a starting value for each of the parameters, specifying an ending keyframe containing ending values for the parameters associated with the functions of the selected set and vacancies for the other parameters associated with other functions, and specifying a number of video frames. The starting keyframe is used to place the machine in a starting state, in which each function has the status defined by the value of its associated parameter in the starting keyframe, and a first video frame is processed with the processing machine in the starting state. The starting keyframe, the ending keyframe and the number of video frames are used to calculate a next frame value for each of the parameters associated with a function in the selected set. The next frame values are used to place the machine in a next frame state, in which each function of the set has the status defined by the next frame value of its associated parameter, while maintaining unaltered the values of the parameters associated with the other functions, and the next video frame is processed with the machine in the next frame state.

5 Claims, 1 Drawing Sheet

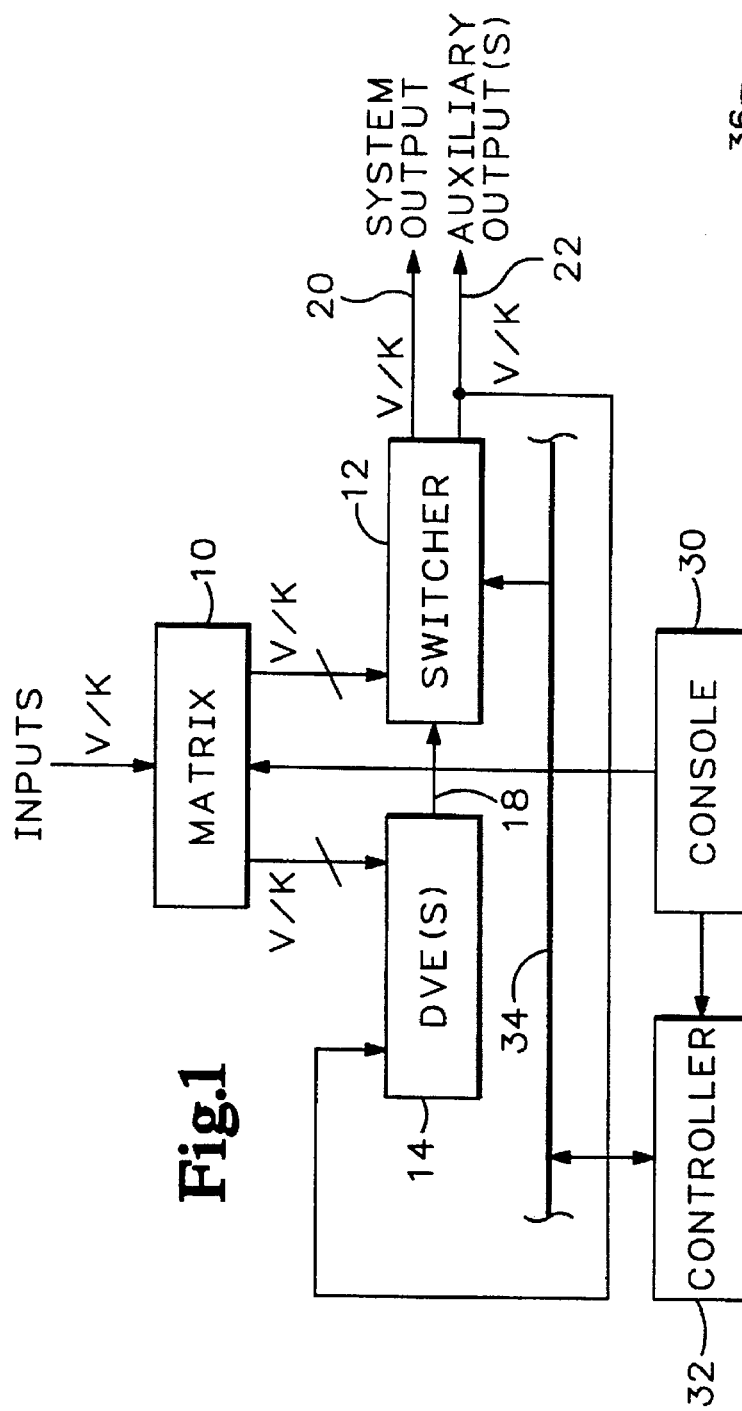
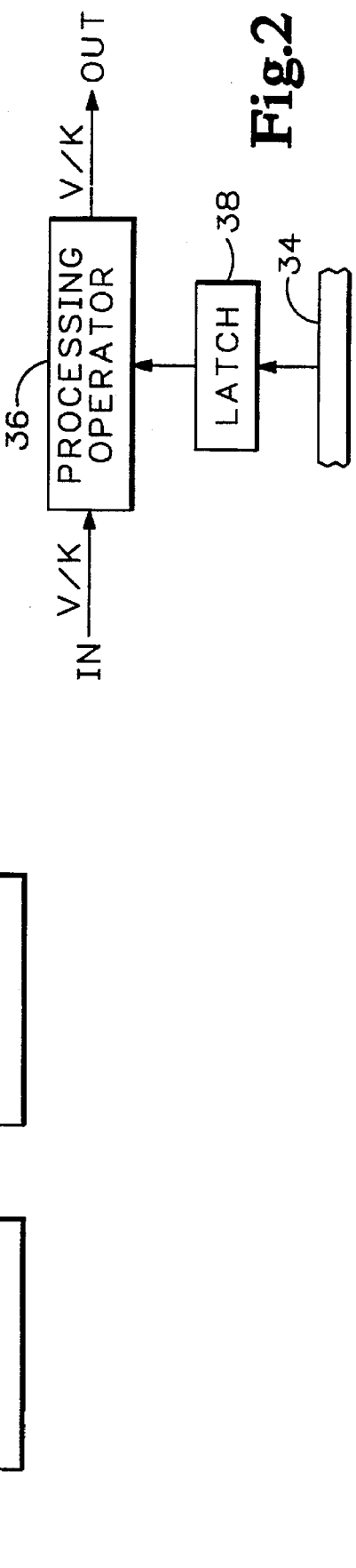

METHOD OF CREATING VIDEO EFFECTS BY USE OF KEYFRAMES

This is a continuation of application Ser. No. 08/055,109 filed May 3, 1993, and now abandoned.

BACKGROUND OF THE INVENTION

This invention relates to a method of creating video effects by use of keyframes.

Two machines that are widely used in creating video effects are the production switcher and the digital video effects device. Each of these video processing machines is used to modify an input video signal in a controlled fashion in order to produce an output video signal. The modification is commonly called an effect. The production switcher may be used to create an effect involving multiple input video signals, e.g. a wipe or dissolve from a first input video signal to a second input video signal. The production switcher may also be used for other purposes, for example to apply a colored border to the image represented by the input video signal. The digital video effects device may be used to create an effect involving a change in size of the image represented by the input video signal relative to the raster of the output video signal, or a change in position of the image represented by the input video signal relative to the output raster.

These video processing machines are highly complex and have numerous functions. The status of each function is defined by the value of a parameter associated with the function. For example, in the case of a production switcher executing a dissolve from input video A to input video B, appropriate functions might be
select video A as program input for mixer M1
select video B as preset input for mixer M1
mix coefficient for mixer M1.

The parameters associated with the first two functions would typically be binary in nature and would each be logical 1 throughout the effect, and the parameter associated with the third function might be a ten bit number that would change smoothly during the effect from logical 0, indicating 100% video A and 0% video B, to logical 1, indicating 0% video A and 100% video B. Each of the other parameters is set to a default value, typically logical 0, such that the associated function is not invoked.

In order to create a simple effect, the machine operator specifies a starting keyframe, an ending keyframe and the number of video frames or fields over which the effect is to take place. Each keyframe is a complete description of the machine state. If, for example, the machine has 100 functions, the status of each function is defined by a parameter and the starting keyframe contains the starting value for each of the 100 function parameters and the ending keyframe contains the ending value for each parameter. When the effect is run, the entire state of the machine is updated at each video frame. For the functions that are in use during the effect, the updated value for the associated parameter is obtained by interpolating between the parameter's starting value and the parameter's ending value. Where the starting value and ending value are the same (select video A and select video B in the case of the example), the interpolated value is the same as the starting value. Similarly, for a function that is not invoked for the effect, the value of the parameter is updated with the default value on each frame.

A somewhat more complex effect might involve translation of the image represented by the input video signal from a starting position at time $t_0$ through three intermediate positions (times $t_1$, $t_2$ and $t_3$) to an ending position (time $t_4$). In this case, it is necessary to specify five keyframes giving the position of the input image at each of the times $t_0$–$t_4$.

This approach to controlling operation of a video processing machine on the basis of keyframes is straightforward and easy to understand, but it has certain limitations in its application. For example, if the producer of the effect employing five keyframes also wishes to create a picture border that turns slowly from blue to red over the duration of the entire effect from $t_0$ to $t_4$, there are only two time values ($t_0$ and $t_4$) at which the parameters that describe the color of the picture border must have specified values. Since the entire state of the machine is changed at each video frame and the parameters are interpolated between consecutive keyframes, it is necessary to include border color information in the three intermediate keyframes for times $t_1$–$t_3$. The producer must therefore estimate the values of the border color parameters at points in time ($t_1$–$t_3$) that are not related to the way in which the border color function is intended to operate. This increases the time spent in creating an effect and increases the chance that the effect will not be what was expected, requiring adjustment of the intermediate keyframes and taking time to estimate other values of the border color parameters.

SUMMARY OF THE INVENTION

According to a first aspect of the present invention there is provided a method of creating a video effect employing a processing machine having a plurality of functions, each of which has a status that is selectively variable in response to change in value of an associated function parameter, said method comprising selecting a set of functions, said set of functions being fewer than said plurality of functions, specifying a starting keyframe containing a starting value for each of said parameters, specifying an ending keyframe containing ending values for only the parameters associated with the functions of said set, specifying a number of video frames, employing the starting keyframe to place the machine in a starting state, in which each function has the status defined by the value of its associated parameter in the starting keyframe, processing a first video frame with the processing machine in the starting state, employing the starting keyframe, the ending keyframe and said number of video frames to calculate a next frame value for each of the parameters associated with a function in said set, employing the next frame values to place the machine in a next frame state, in which each function of the set has the status defined by the next frame value of its associated parameter, while maintaining unaltered the values of the parameters associated with functions that are not members of said set, and processing a next video frame with the machine in said next frame state.

According to a second aspect of the present invention there is provided a method of creating a video effect employing a processing machine having a plurality of functions, each of which has a status that is selectively variable in response to change in value of an associated function parameter, said method comprising selecting first and second sets of functions, each set containing fewer functions than said plurality of functions, specifying a starting keyframe containing a starting value for each of said parameters, specifying an intermediate keyframe containing ending values for only the parameters associated with the functions of said first set, specifying an ending keyframe containing ending values for only the parameters associated with the functions of said second set, specifying first and second numbers of video frames, said second number being greater than said first number, employing the starting keyframe to place the machine in a starting state, in which each function has the status defined by the value of its associated function parameter in the starting keyframe, processing a first video frame with the processing machine in the starting state, employing the starting keyframe, the intermediate keyframe and the first number to calculate a next frame value for each of the parameters associated with a function in said first set, employing the starting keyframe, the ending keyframe and the second number to calculate a next frame value for each of the parameters associated with a function in said second set and not in said first set, employing the next frame values to place the machine in a next frame state, in which each function of the first and second sets has the status defined by the next frame value of its associated parameter, while maintaining unaltered the values of the parameters associated with functions that are not members of the first set or the second set, and processing a next video frame with the machine in said next frame state.

BRIEF DESCRIPTION OF THE DRAWINGS

For a better understanding of the invention, and to show how the same may be carried into effect, reference will now be made, by way of example, to the accompanying drawings, in which:

FIG. 1 is a block diagram of apparatus for creating video effects; and

FIG. 2 is a block diagram of a component of the apparatus.

DETAILED DESCRIPTION

The apparatus shown in FIG. 1 comprises a crosspoint switching matrix 10 having multiple inputs connected to receive respective input video signals and having multiple outputs. One set of outputs of the crosspoint matrix 10 are connected to respective inputs of a production switcher 12 and another set of outputs of the crosspoint matrix are connected to inputs of at least one digital video effects (DVE) device 14. The DVE device 14 has a DVE program output 18 that is connected to a further input of the production switcher. The switcher has a system program output 20, and also has an auxiliary output 22 that is connected to an input of the DVE device 14. The matrix 10 receives key signals associated with the respective input video signals, and the key signals are supplied to the DVE device 14 and switcher 12, and the outputs of the DVE device 14 and switcher 12 are video signals and associated key signals. The matrix 10, the switcher 12 and the DVE device 14 may all be of conventional form. It will be appreciated that the apparatus might comprise several DVE devices performing different functions.

The apparatus shown in FIG. 1 also has a console 30 having manual controls for setting the state of the production switcher 12 and the DVE device 14. Each manual control includes a transducer for generating an electrical signal in response to actuation of the control. In the case of an on-off switch, the signal is binary in nature, whereas in the case of a lever arm or knob having a range of positions and typically calibrated by reference to an analog scale, the signal might be a ten-bit wide digital signal. The signal provided by a transducer is representative of the value of the parameter associated with the function that is controlled by the particular manual control.

The console 30 communicates with the production switcher 12 and the DVE device 14 by way of a controller 32 and a bus 34. The controller 32 generates digital words representative of the values of the parameters and delivers these digital words to the switcher 12 and the DVE device 14 by way of the bus 34.

The production switcher 12 and the DVE device 14 each include multiple processing operators. A typical processing operator 36 is illustrated in generic form in FIG. 2, and has at least one video signal input, a video signal output and a parameter input. The digital word representing the value of the parameter associated with the function controlled by a transducer is loaded from the bus 34 into a latch 38, whose output is connected to the parameter input of the processing operator 36. The processing operator operates on the video input in accordance with a function that depends on the nature of the operator and has an argument that depends on the control signal. For example, in the switcher 12 the operator might be a mixer that receives two input video signals A and B and a control signal X and returns an output signal $A*X+B*(1-X)$.

Similarly, the DVE device performs multiple functions such as scaling, translation and rotation. The functions of the DVE device generally depend upon the relationship between read and write addresses used to access a frame or field memory, and consequently it is not accurate to discuss these functions as discrete operations. Nevertheless, the DVE device includes an interface that receives the parameter (scale, rotate, translate) signals from the console and generates appropriate control signals for application to the addressing circuitry of the DVE device. Further, the DVE device may include an input selector and one or more mixers, and such operators would receive suitable control signals provided by the console.

In order to construct an effect, the producer determines the length of the effect (usually in video frames) and describes what is to happen during selected intervals within the effect. This might be accomplished by sketching the effect at various key points, or writing a narrative account referring to the key points. The producer specifies at least two keyframes. For the purpose of the following example, it will be assumed that the effect involves a background scene with a blue border that progressively changes to red over the duration of the effect. During the effect, a foreground scene derived from video A is moved from an initial location to a final location by way of three intermediate locations, without any change in scale or rotation. Initially, the background scene is derived from video B, but while the foreground scene moves from the first intermediate location to the final location, the background video changes linearly to video C. No drop shadow effect or mirror effect is invoked.

In order to create this effect, the producer first initializes the apparatus by clearing all functions to the off state. The producer then specifies five keyframes ($KF_0$–$KF_4$) by operating the apparatus in a "create effect" mode. In this mode, the producer first selects $KF_0$, specifies the starting value for each parameter by reference to the effect description, and then selects INSERT to load the parameter values into a random access memory (RAM) associated with the controller 32. As in the case of the known video processing machine, keyframe 0 is a complete description of the machine's initial state. The contents of keyframe 0 are indicated in column 0 of Table I. After entering the parameter values for keyframe 0, the operator selects keyframe 1, and specifies the values of parameters that are critical at the time of keyframe 1. In the case of the example, the description specifies that the foreground video should be at location ($X_1$, $y_1$) in the raster of the output video signal and that a mix from video B to video C should commence. The operator therefore specifies the values indicated in column 1 of Table I. Values for other parameters are not specified. The controller determines what parameter values have been changed either by dynamically tracking the state of the manual controls that the operator changes during set-up of keyframe 1 or by testing the setting of each control against the value of the associated parameter stored for keyframe 0. The operator selects INSERT and loads the parameter values for keyframe 1. In similar fashion, parameter values for keyframes 2, 3 and 4 are entered.

TABLE I

|  | Keyframe | | | | |
| --- | --- | --- | --- | --- | --- |
|  | 0 | 1 | 2 | 3 | 4 |
| Insert FGD | on | | | | |
| Foreground | on | | | | |
| Select Video A | on | | | | |
| Select Video B | off | | | | |
| Select Video C | off | | | | |
| Select Mixer M1 | off | | | | |
| Background | on | | | | |
| Select Video A | off | | | | |
| Select Video B | on | | | | |
| Select Video C | off | | | | |
| Select Mixer M1 | off | on | | | |
| FGD Location | $(X_0,Y_0)$ | $(X_1,Y_1)$ | $(X_2,Y_2)$ | $(X_3,Y_3)$ | $(X_4,Y_4)$ |
| Border | on | | | | |
| Border width | W1 | | | | |
| Border color | blue | | | | red |
| Mixer M1 | off | on | | | |
| Select video A | | off | | | |
| Select video B | | on | | | |
| Select video C | | on | | | |
| Mix coefficient | | 0% | | | 100% |
| Other effects | off | | | | |

In Table I, the entry other effects relates to other effects that might be used but are not in fact used in constructing the overall effect.

The parameter values associated with a given keyframe are stored in a region of the RAM that is accessed by use of an address representative of the keyframe number. For keyframes other than the first keyframe, the data that is stored within the associated region of the memory is representative only of the parameters that are active and for which values are specified for that keyframe. For example, the contents of the memory regions for keyframes 0, 1 and 4 are shown in Table II.

TABLE II

| | Keyframe 0 | Keyframe 1 | Keyframe 4 |
| --- | --- | --- | --- |
| Insert FGD | on | Background | FGD Location |
| Foreground | | Select video B off | $(X_4,Y_4)$ |
| Select Video A | on | Select Mixer M1 on | Border |
| Select Video B | off | FGD Location | Color red |
| Select Video C | off | $(X_1,Y_1)$ | Mixer M1 |
| Select Mixer M1 | off | Mixer M1 | Coeff. 100% |
| Background | | Select Video B on | |
| Select Video A | off | Select Video C on | |
| Select Video B | on | Coeff. 0% | |
| Select Video C | off | | |
| Select Mixer M1 | off | | |
| FGD Location | $(X_0,Y_0)$ | | |
| Border on | | | |
| Width W1 | | | |
| Color Blue | | | |
| Mixer M1 off | | | |
| Other effects | off | | |

When the parameter values for the keyframes have been entered, the producer operates the apparatus in the "run effect" mode. The values specified in keyframe 0 are applied to the production switcher and the DVE device, and the apparatus processes the first video frame in this state. During processing of the first video frame, the controller tests the value of each parameter for which the function is on in keyframe 0 against each of the later keyframes to determine what, if any, is the earliest later keyframe at which another value of that parameter is specified. For each parameter that is identified in this test, the controller calculates an interpolated value for use during processing of the second video frame. The relationship between the interpolated value and the source ($KF_0$) and destination ($KF_1$) values for the parameter depends on the interpolation function that is associated with the parameter. In the case of a parameter that can vary in a quasi-continuous fashion, linear interpolation, S-linear interpolation or cubic interpolation might be employed. In the case of a binary parameter, the interpolation function would normally be a zero order or hold function. For the location parameter, the controller finds that the value $(X_1,Y_1)$ is specified for keyframe 1. Since location is a quasi-continuous variable, the controller calculates an interpolated value for location based on the values specified in keyframe 0 and keyframe 1 and the number of video frames between keyframe 0 and keyframe 1 and delivers this value of the location parameter to the DVE's addressing circuitry. For the border color parameter, the controller determines that red is specified for keyframe 4, and calculates an updated color from the parameters defining blue and red and the number of video frames between keyframe 0 and keyframe 4. Functions for which the parameter is specified in keyframe 0 as being off are ignored, as are parameters that are not off but for which there is no other value specified for any of the later keyframes. During the vertical blanking interval following the second field of video frame 0, the updated values for location and border color are applied to the DVE device and the production switcher respectively, whereas the values for the other functions remain unchanged. The values for the other functions are not reloaded, but remain unchanged. This operation is repeated for successive video frames until processing frame $N_1$-1, where $N_1$ is the number of the video frame associated with keyframe 1. During frame $N_1$-1, the controller selects the values for location, status of mixer M1, select video B, select video C and mix coefficient that are specified for keyframe 1, but calculates interpolated color parameter values for the border color function. These values are applied to the appropriate operators and are used to process frame $N_1$. During frames $N_1$ to $N_2$, the operation proceeds as before except that the location value is interpolated between ($X_1$, $Y_1$) and ($X_2$, $Y_2$), mixer M1 is operative and the mix coefficient is interpolated between 0% at frame $N_1$ and 100% at frame $N_4$. From frame $N_2$ until frame $N_4$, the operation continues in similar fashion.

By defining the keyframes that occur after $KF_0$ as including only parameters that are given new values at the video frame with which the keyframe is associated, it is not necessary for the operator to estimate or calculate values that are not related to the change that is to take place at that video frame. Therefore, it takes less time to create the effect than with conventional machines, and the possibility of the effect differing from what was expected is reduced.

The topology of the controller 32 is essentially the same as the topology of the controller of a convention video processing machine, in that it includes a processor, a program memory and a working memory, but the contents of the program memory support the method described with reference to FIGS. 1 and 2.

It will be appreciated that the invention is not restricted to the particular embodiment that has been described, and that variations therein may be made without departing from the scope of the invention as defined in the appended claims and equivalents thereof. For example, although the invention has been described in the context of a video effect in which the time granularity is one video frame, it could also be applied to an effect in which the time granularity is one video field. Accordingly, video frame as used in the following claims means both a video frame (either interlaced or non-interlaced) and a video field. Also, it is not necessary that the region of RAM associated with a particular keyframe contain no data relating to a parameter for which no value is specified for that keyframe, and the RAM may instead contain an entry confirming that the parameter has no value specified for the keyframe.

It is claimed:

1. A method of creating a video effect using a processing machine having a plurality of functions, each function having at least one parameter that defines either a state or a variable, the video effect further being defined by a sequence of keyframes, comprising the steps of:

creating a keyframe table defining a start keyframe, an end keyframe and at least one intermediate keyframe, the start keyframe having a start parameter value for each function of the processing machine to be used for the video effect, and each subsequent keyframe having a next parameter value only for those parameters that are critical at that keyframe;

setting an interval between each keyframe in the sequence; and interpolating the parameter values of the variable parameters for video frames between keyframes as a function of the difference between start and next parameter values and a total interval, the total interval being the sum of the intervals between the keyframes containing the start and next parameter values.

2. The method as recited in claim 1 wherein the interpolating step comprises the step of linear interpolating between the parameter values.

3. The method as recited in claim 1 wherein the interpolating step comprises the step of S-linear interpolating between the parameter values.

4. The method as recited in claim 1 wherein the interpolating step comprises the step of cubic interpolating between the parameter values.

5. The method as recited in claim 1 wherein the interpolating step comprises the step of calculating between parameter values by a zero order function.

* * * * *